United States Patent
Koshiro

(10) Patent No.: US 10,139,074 B2
(45) Date of Patent: Nov. 27, 2018

(54) VEHICULAR LIGHT GUIDE MEMBER AND VEHICULAR LIGHTING EQUIPMENT

(71) Applicant: ICHIKOH INDUSTRIES, LTD., Isehara-shi, Kanagawa-ken (JP)

(72) Inventor: Hiroshi Koshiro, Isehara (JP)

(73) Assignee: ICHIKOH INDUSTRIES, LTD., Isehara-Shi (JP)

( * ) Notice: Subject to any disclaimer, the term of this patent is extended or adjusted under 35 U.S.C. 154(b) by 93 days.

(21) Appl. No.: 15/301,834

(22) PCT Filed: Mar. 24, 2015

(86) PCT No.: PCT/JP2015/058969
§ 371 (c)(1),
(2) Date: Oct. 4, 2016

(87) PCT Pub. No.: WO2015/156121
PCT Pub. Date: Oct. 15, 2015

(65) Prior Publication Data
US 2017/0030546 A1    Feb. 2, 2017

(30) Foreign Application Priority Data

Apr. 7, 2014   (JP) ................. 2014-078810

(51) Int. Cl.
*G02B 6/122* (2006.01)
*F21S 8/10* (2006.01)
(Continued)

(52) U.S. Cl.
CPC ............ *F21S 43/237* (2018.01); *F21S 43/14* (2018.01); *F21S 43/245* (2018.01); *G02B 6/001* (2013.01); *F21S 43/13* (2018.01); *G02B 17/006* (2013.01)

(58) Field of Classification Search
CPC ........ F21S 43/237; F21S 43/235; F21S 41/24; F21S 41/30; F21S 43/14; G02B 6/0055; G02B 6/001; G02B 17/006
See application file for complete search history.

(56) References Cited

U.S. PATENT DOCUMENTS 6,305,813 B1 * 10/2001 Lekson ............... B60Q 1/302
362/625
2011/0242831 A1  10/2011 Okui et al.
2014/0036522 A1   2/2014 Nakada

FOREIGN PATENT DOCUMENTS

| DE | 10 2007 023 076 A1 | 11/2008 |
| JP | 2012-190762 A | 10/2012 |
| JP | 2014-032747 A | 2/2014 |

OTHER PUBLICATIONS

Japanese Office Action dated Oct. 31, 2017 issued in corresponding application No. 2014-078810 and English translation thereof.
(Continued)

*Primary Examiner* — Karabi Guharay
(74) *Attorney, Agent, or Firm* — Foley & Lardner LLP

(57) ABSTRACT

The invention is a light guide member that utilizes total reflection to guide light. An entry surface, an exit surface, a main reflection portion, a secondary reflection portion, and a linking portion are provided. The main reflection portion has a main reflection surface. The secondary reflection portion has a secondary reflection surface. The linking portion is provided between the main reflection portion and the secondary reflection portion. As a result of the present invention, mold machining is straightforward, and the flow of resin material during casting is adequate.

7 Claims, 7 Drawing Sheets

(51) Int. Cl.
  *F21S 43/237*  (2018.01)
  *F21S 43/245*  (2018.01)
  *F21S 43/14*   (2018.01)
  *F21V 8/00*    (2006.01)
  *F21S 43/13*   (2018.01)
  *G02B 17/00*   (2006.01)

(56) References Cited

OTHER PUBLICATIONS

Supplementary European Search Report issued in corresponding application No. 15 77 6077 dated Oct. 20, 2017.

* cited by examiner

VEHICULAR LIGHT GUIDE MEMBER AND VEHICULAR LIGHTING EQUIPMENT

TECHNICAL FIELD

The present invention relates to a vehicular light guide member. In addition, the present invention relates to vehicular lighting equipment which is provided with the vehicular light guide member.

BACKGROUND ART

Conventionally, a vehicular light guide member and vehicular lighting equipment which is provided with the vehicular light guide member are conventionally known (for example, Patent Literature 1). Hereinafter, conventional vehicular lighting equipment of Patent Literature 1 will be described. In so far as the conventional vehicular lighting equipment is concerned, a columnar light guide body is provided in a lamp room of the lighting equipment, and at predetermined positions in a circumferential direction on a side face of the light guide body, a first interior surface reflection step and one or a plurality of second interior surface reflection steps are formed along an extension direction of the light guide body. In the conventional vehicular lighting equipment, the guided light inside the light guide body from a light incidence end part to the other end part is traced by the first interior surface reflection step and the second interior surface reflection steps and then the traced light is emitted from the light guide body to the outside; and therefore, the light can be efficiently utilized.

CITATION LIST

Patent Literature

Patent Literature 1: Japanese Unexamined Patent Application Publication No. 2012-190762

SUMMARY OF THE INVENTION

Problems to be Solved by the Invention

However, in so far as the conventional vehicular lighting equipment is concerned, at the predetermined positions in the circumferential direction on the side face of the light guide body, the first interior surface reflection step and the second interior surface reflection steps are formed along the extension direction of the light guide body. Therefore, between the first interior surface reflection step and each of the second interior surface reflection steps, a gap (a space) is produced (formed). Due to this gap, there is a problem that mold machining is difficult and the flow (flowing) of a resin material at the time of casting is poor.

A problem to be solved by the present invention is that, in the conventional vehicular light guide member and vehicular lighting equipment, mold machining is difficult and the flow of the resin material at the time of casting is poor.

Means for Solving the Problem

In first aspect of the present invention, a vehicular light guide member which forms a rod shape to guide light by utilizing total reflection inside thereof, comprising: an incidence surface to make light incident thereto; an emission surface to emit the incident light; a main reflection portion having a main reflection surface to reflect the incident light to the emission surface side; a secondary reflection portion having a secondary reflection surface to reflect the incident light to the emission surface side; and a linking portion which is disposed between the main reflection portion and the secondary reflection portion.

In second aspect of the present invention, the vehicular light guide member according to the first aspect, the linking portion has a linking reflection surface to reflect the incident light to the emission surface side.

In third aspect of the present invention, the vehicular light guide member according to the second aspect, the linking reflection surface reflects the incident light to the emission surface side, and from the emission surface, emits the reflected light as a linking light distribution pattern between a main light distribution pattern, which is reflected by the main reflection surface and emitted from the emission surface, and a secondary light distribution pattern, which is reflected by the secondary reflection surface and emitted from the emission surface.

In fourth aspect of the present invention, vehicular lighting equipment comprising: a lamp housing and a lamp lens which partition a lamp room; and a light source which is disposed in the lamp room and the vehicular light guide member according to claim 1 to make light from the light source incident thereto through the incidence surface.

In fifth aspect of the present invention, the vehicular lighting equipment according to the fourth aspect, the vehicular lighting member has at least a vertical portion, the secondary reflection portion and the linking portion are installed at least at the vertical portion, and the secondary light distribution pattern and the linking light distribution pattern are emitted to an outside of a vehicle.

Effect of the Invention

In so far as a vehicular light guide member and vehicular lighting equipment of the present invention is concerned, a linking portion is provided between a main reflection portion and a secondary reflection portion. Thus, between the main reflection portion and the secondary reflection portion, there is no case such that a gap is produced due to the linking portion. As a result, there is an advantageous effect that mold machining is easy and the flow of a resin material at the time of casting is good, etc.

MODE FOR CARRYING OUT THE INVENTION

Figure 1:
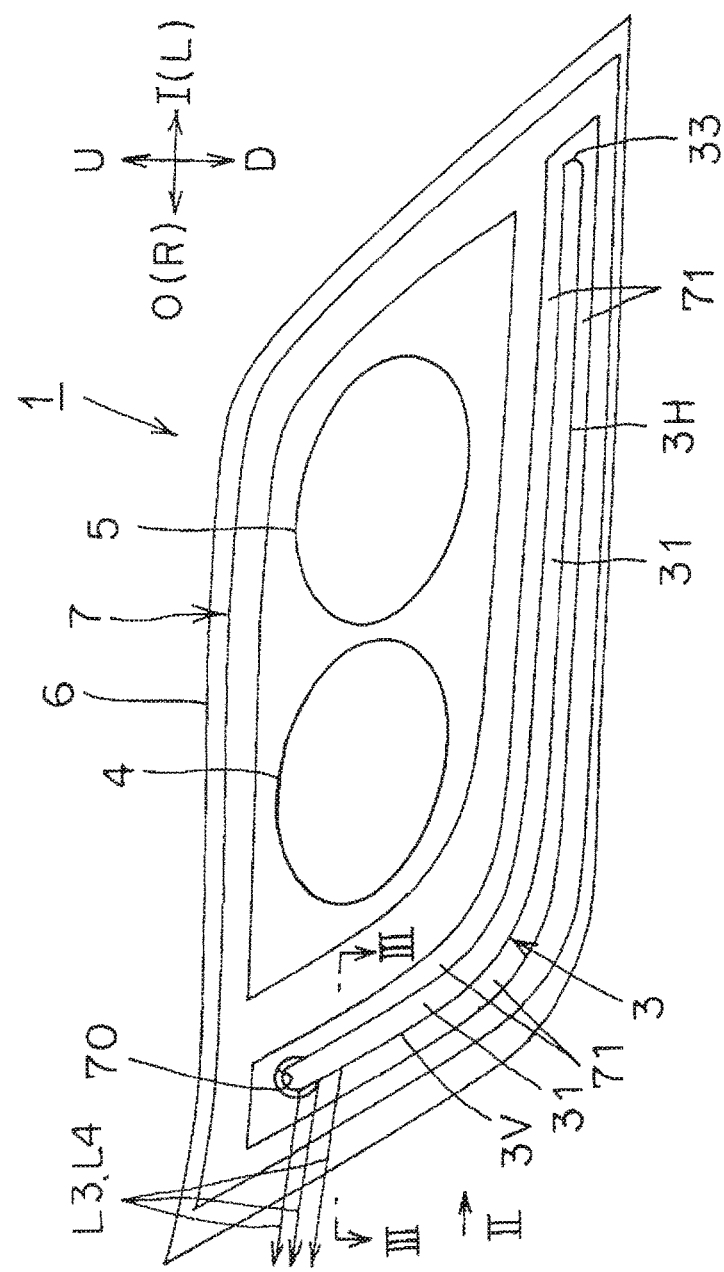
FIG. 1 is a front view showing a first embodiment of a vehicular light guide member and vehicular lighting equipment according to the present invention.

Hereinafter, two examples of the embodiments (exemplary examples) of a vehicular light guide member and vehicular lighting equipment according to the present invention will be described in detail with reference to the drawings. It is to be noted that the present invention is not limited by the embodiments. In the specification, the terms "front", "rear", "top", "bottom", "left", and "right" respectively designate the front, rear, top, bottom, left, and right in a case where a vehicular is equipped with the vehicular light guide member and vehicular lighting equipment.

In the drawings, reference code "F" designates a front side of a vehicle (the forward direction of the vehicle). The reference code "B" designates a rear side of the vehicle. Reference code "U" designates an upper side in a case where the front side is seen from a driver side. Reference code "D" designates a lower side in a case where the front side is seen from the driver side. Reference code "L" designates a left side in a case where the front side is seen from the driver side. Reference code "R" designates a right side in a case where the front side is seen from the driver side.

Reference code "I" designates an inside of the vehicular. Reference code "O" designates an outside of the vehicular. In addition, in FIG. 3, FIG. 5, and FIG. 6, hatching of the vehicular light guide member is omitted. Further, light is indicated by the solid arrow and the dashed arrow in the figures. In FIG. 4 and FIG. 7, reference code "VU-VD" designates a vertical line from the top to bottom of the screen, and reference code "HL-HR" designates a horizontal line from the left to right of the screen.

(Description of Configuration of First Embodiment)

FIG. 1 to FIG. 5 each show a first embodiment of a vehicular light guide member and vehicular lighting equipment according to the present invention. Hereinafter, the vehicular light guide member and vehicular lighting equipment according to the first embodiment will be described. In FIG. 1, reference numeral 1 designates the vehicular lighting equipment according to the first embodiment. The vehicular lighting equipment 1 is, for example, a clearance lamp, a turn signal lamp, and a daytime running lamp of front combination lamps such as vehicular head lamps or head lamps.

The vehicular lighting equipment 1 is mounted on each of the left and right sides L and R at a front part of a vehicle (not shown). A design surface at the front part of the vehicular inclines in the forward direction of the vehicle (from the rear side N to the front side F of the vehicle) and in the vertical direction (from the upper side U to the lower side B of the vehicle) and in the transverse direction (from the outside O to the inside I of the vehicle).

In the right side vehicular lighting equipment 1 that is mounted at the right side R of the vehicle, the vehicular outside O is present at the right side R, and the vehicular inside I is present at the left side L. On the other hand, in the left side vehicular lighting equipment 1 that is mounted at the left side L of the vehicle, the vehicular outside is present at the left side L, and the vehicular inside I is present at the right side.

Hereinafter, the right side vehicular lighting equipment 1 that is mounted at the right side of the vehicle will be described. It is to be noted that the left side vehicular lighting equipment that is mounted at the left side L of the vehicle forms a construction that is almost similar to that of the right side vehicular lighting equipment 1 except that the left and right thereof are reversed therefrom; and therefore, a duplicate description thereof is omitted.

(Description of Vehicular Lighting Equipment 1)

Figure 2:
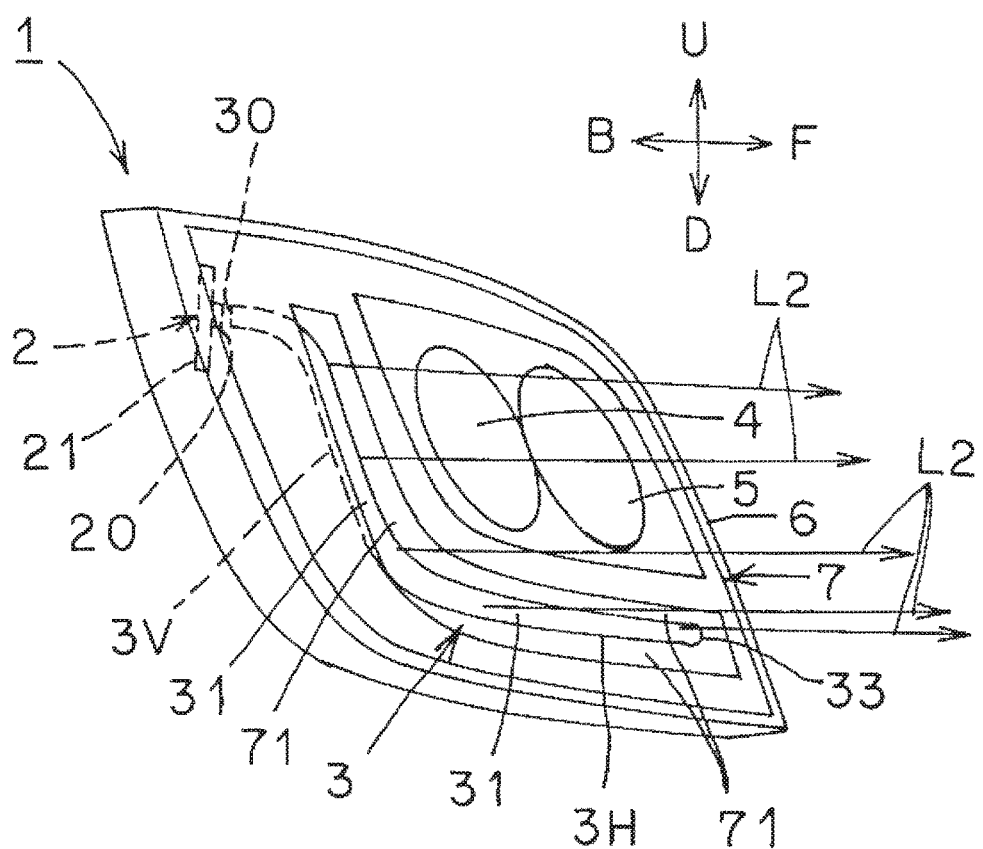
FIG. 2 is a right side view (a view taken along the line II in FIG. 1) showing the vehicular light guide member and vehicular lighting equipment.

The vehicular lighting equipment 1, as shown in FIG. 1 and FIG. 2, is provided with: a semiconductor-type light source 2 as one light source; one (a single) light guide member 3 as a vehicular light guide member according to the first embodiment; a low beam headlamp 4 and a high beam headlamp 5 as other lamp units; a lamp housing (not shown); a lamp lens (such as a transparent outer cover or an outer lens, for example) 6; and an inner panel (an inner housing) 7.

The semiconductor-type light source 2 and the light guide member 3 constitute a clearance lamp, a turning signal lamp, and a daytime running lamp. The semiconductor-type light source 2, the light guide member 3, the low beam headlamp 4, the high beam headlamp 5, and the inner panel 7 are disposed in a lamp room (not shown) which is partitioned by the lamp housing and the lamp lens 6. Apart of the semiconductor-type light source 2 and the light guide member 3 is covered with the inner panel 7 when these constituent elements are seen from the lamp lens 6. It is to be noted that, as shown in FIG. 1 and FIG. 2, a major part of the light guide member 3, the low beam headlamp 4, the high beam headlamp 5, and the inner panel 7 can be seen through the lamp lens 6.

Incidentally, in the lamp room, there may be a case in which other lamp units (not shown) such as a fog lamp or a cornering lamp are disposed in addition to the semiconductor-type light source 2 and the light guide member 3 as the clearance lamp, the turning signal, or the daytime running lamp and the low beam headlamp 4 and the high beam headlamp 5 as such other lamp units.

(Description of Semiconductor-type Light Source 2)

The semiconductor-type light source 2, as shown in FIG. 2, in this example, a self-emission semiconductor-type light source such as an LED, an OEL, or an OLED (an organic EL), for instance. The semiconductor-type light source 2 is composed of a light emission portion 20 and a substrate 21. The semiconductor-type light source 2 is disposed at the outside O (the right side) of the vehicle in the lamp room and at the portions of the rear side B and the upper side U. The semiconductor-type light source 2 is mounted directly the lamp housing or via another member (not shown).

(Description of Light Guide Member 3)

The light guide member 3 is a member to guide the light from the semiconductor-type light source 2, through an incidence surface 30 to an emission surface 31, utilizing total reflection (interior surface reflection) inside thereof. The light guide member 3, in this example, is composed of a transparent resin material such as an acrylic resin or PC (polycarbonate) or PMMA (methyl polymethacrylate or methacryl resin). The light guide member 3 forms a columnar shape of which sectional shape is a circular shape and which is similar or substantially similar in shape from one end to the other end, that is, a circular bar shape. A diameter of the light guide member 3 is, in this example, about 6 mm to 8 mm).

A direction for guiding light of the light guide member 3, that is, a light guide direction is a centerline (central axial) direction of the light guide member 3 that forms a columnar shape of which sectional shape is a circular shape.

The light guide member 3, as shown in FIG. 1 and FIG. 2, is made of a vertical portion 3V on one end side and a horizontal portion 3H at the other end side, along a design surface at the front part of the vehicle and on a design surface of the lamp lens 6.

That is, the light guide member 3 forms an L-shape in a front view and in a side view. The vertical portion 3V of the light guide member 3 is disposed along an edge of the outside O (the right side) of the vehicle in the lamp room. The horizontal portion 3H of the light guide member 3 is disposed along an edge of the lower side D in the lamp room.

The light guide member 3, as shown in FIG. 2, in a side view (in a right side view), is disposed so as to incline from the rear side B to the front side F of the vehicle in the lamp room, from the upper side U to the lower side D of the vehicle. The light guide member 3 is mounted directly to the lamp housing or via another member (not shown). For example, a mounting piece (not shown) which is provided to be integral with the light guide member 3 is mounted directly to the lamp housing or via another member (not shown).

The light guide member 3 is intended to guide light by utilizing total reflection inside thereof. The light guide member 3 is provided with: the incidence surface 30 as one end surface; the emission surface 31; the other end surface 33; a main reflection portion 35 having a main reflection surface 34; a secondary reflection portion 37 having a secondary reflection surface 36; and a linking portion 39 having a linking reflection surface 38.

(Description of Incidence Surface 30)

The incidence surface 30 is provided on one end surface of the light guide member 3. The incidence surface 30 opposes to the light emission portion 20 of the semiconductor-type light source 2. A center of the incidence surface 30 and a center of the light emission portion 20 are coincident or substantially coincident with each other. The incidence surface 30 is made of a planar or curved surface or a combination of planar and curved surfaces. The incidence surface 30 is intended to ensure that the light that is radiated from the light emission portion 20 is incident into the light guide member 3. The incidence surface 30 and the semiconductor-type light source 2, as shown in FIG. 2, is disposed at the outside O (the right side r) and at the upper side U) of the vehicle.

(Description of Emission Surface 31)

The emission surface 31 is provided from one side face (that is, a front face) at the front side F of the light guide member 3 to one side face at the right side R. The emission surface 31 opposes to the lamp lens 6. The emission surface 31 is made of an archery surface of which sectional shape is a circular shape formed in the light guide member 3. The emission surface 31 is intended to emit the incident light L1 that has been made incident through the incidence surface 30 into the light guide member 3, as light emission light beams L2, L3, L4, to the outside from the inside of the light guide member 3.

(Description of Main Reflection Surface 34 and Main Reflection Portion 35)

The main reflection surface 34 and the main reflection portion 35 are provided on one side face of the rear side B of the light guide member 3 (that is, on a rear face). The main reflection surface 34 reflects a part of the incident light L1 that has been made incident through the incidence surface 30 into the light guide member 3, as reflection light L5 (refer to the solid arrow in FIG. 3), to the emission surface 31 side and the front side F (that is, the front face side) of the emission surface 31. In addition, the main reflection surface 34 is intended to emit the emission light L2 (refer to the solid arrow in FIG. 3) as a main light emission pattern P1 from the emission surface 31.

Figure 3:
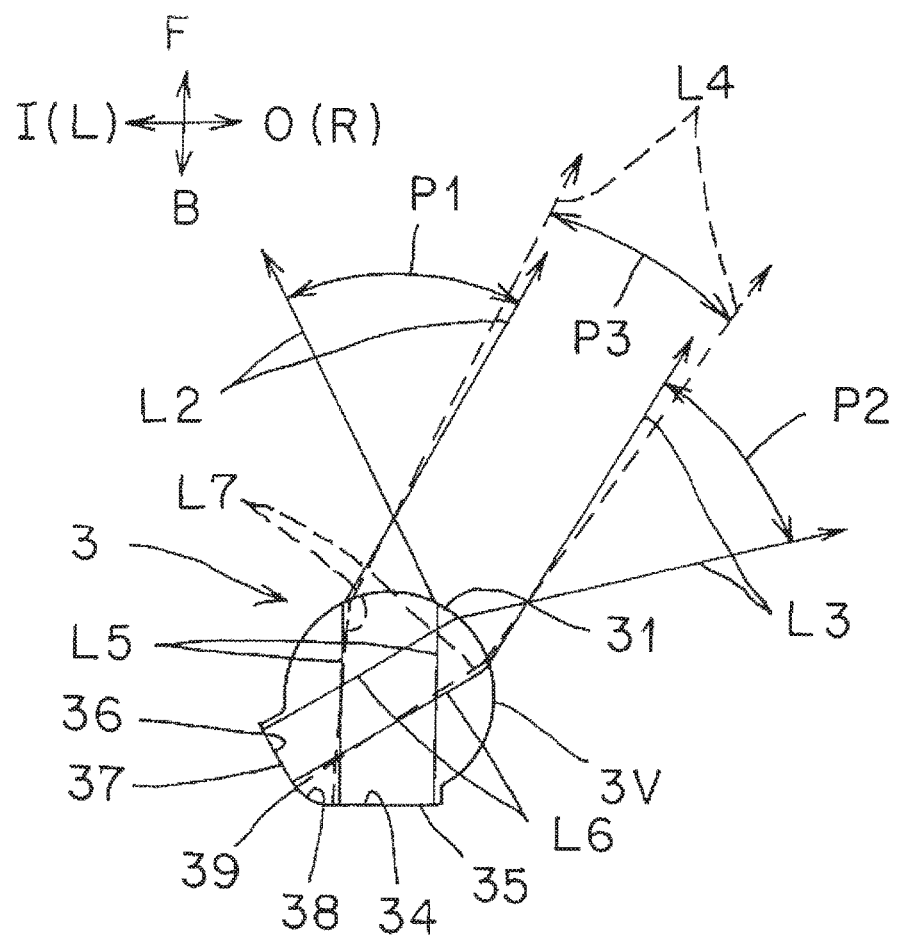
FIG. 3 is an enlarged sectional view (an enlarged sectional view taken along the line in FIG. 1) showing essential parts of the light guide member and is also an explanatory view of an optical path of light emitted from the light guide member.
Figure 4:
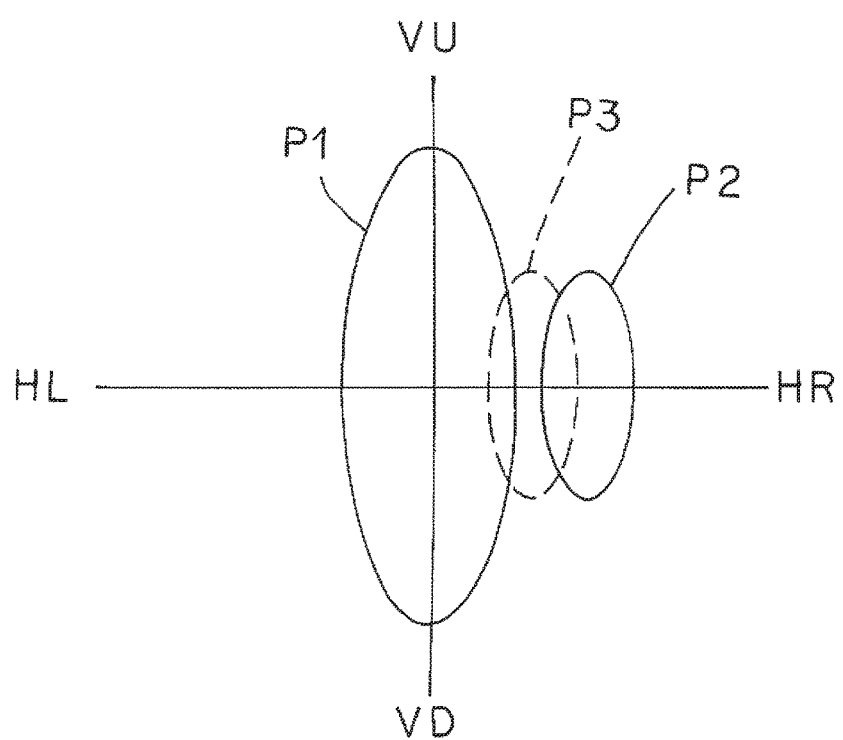
FIG. 4 is an explanatory view showing light distribution patterns emitted from the light guide member.

The main reflection surface 34 forms a linear surface in a cross section (the cross section cut in a direction orthogonal or substantially orthogonal to the light guide direction of the light guide member 3) and thus as indicated by the solid arrow in FIG. 3, the reflection light L5 is substantially parallel light. The emission surface 31 forms an arc surface in a sectional shape and thus as indicated by the solid arrow in FIG. 3, the emission light L2 is scattered light. The main light distribution pattern P1, as shown in FIG. 4, is emitted to a central part at a crossing point between the vertical line VU-VD from the top to bottom of the screen and the horizontal line HL-HR from the left to right thereof.

Figure 5:
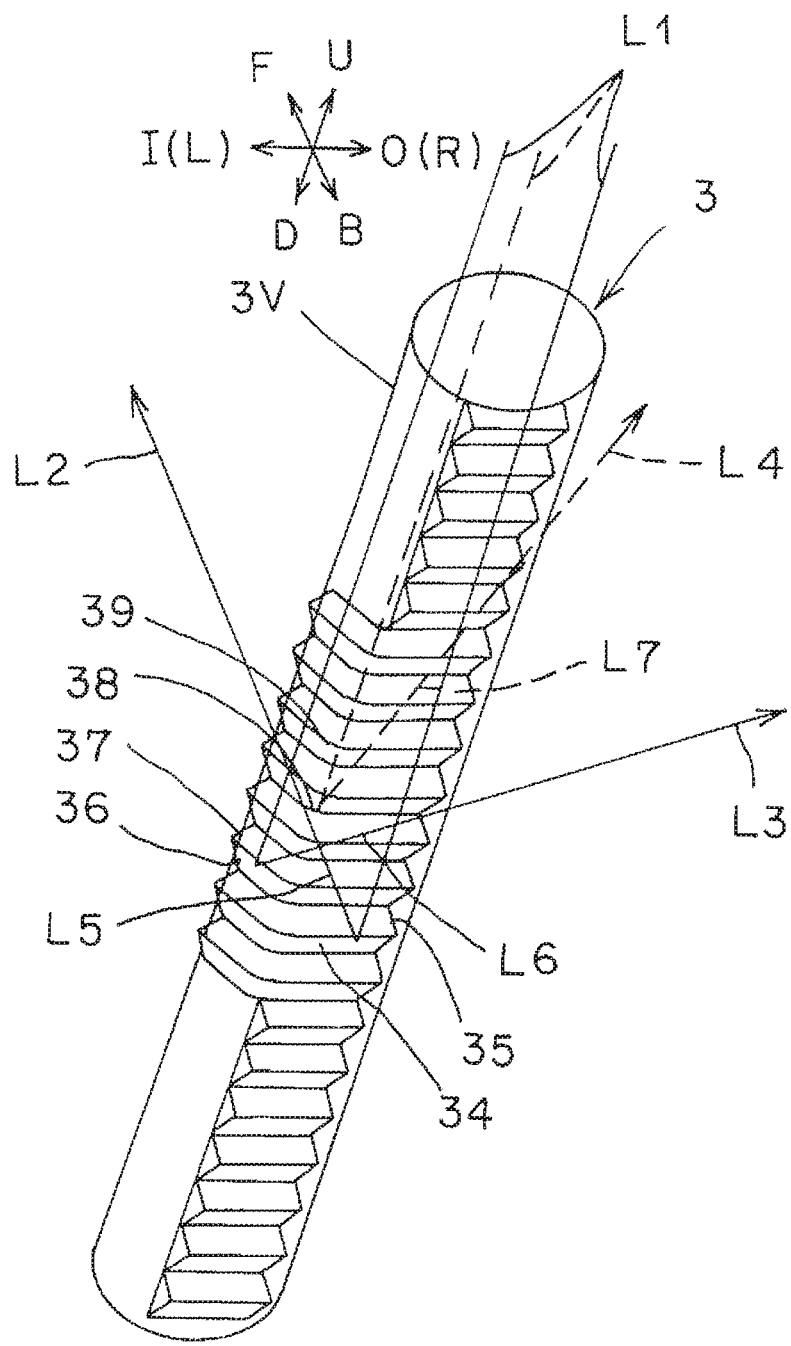
FIG. 5 is a partially enlarged perspective view showing essential parts of the light guide member.

The main reflection surface 34, as shown in FIG. 3 and FIG. 5, is provided to be continuous in plurality in the light guide direction from one end surface to the other end surface 33 of the light guide member 3. The main reflection surface 34 is not provided at one end part on the incidence surface 30 side of the light guide member 3 and at a portion which is covered with the inner panel 7. A width of the main reflection surface 34 is, in this example, about 2 mm.

Between the main reflection surface 34 and the main reflection surface 34, a planer (or curved) stepped surface is interposed. That is, the main reflection surface 34 is provided to be continuous in plurality via the stepped surface. One of the main reflection surfaces 34 and one stepped surface form one prism, that is, one of the main reflection portions 35.

(Description of Secondary Reflection Surface 36 and Secondary Reflection Portion 37)

The secondary reflection surface 36 and the secondary reflection portion 37 are provided on one side face of a somewhat left side L at the rear side B of the light guide member 3 (that is, the somewhat left side on the rear face). The secondary reflection surface 36 reflects a part of the incident light L1 that has been made incident through the incidence surface 30 into the light guide member 3, as reflection light L6 (refer to the solid arrow in FIG. 3), to the emission surface 31 side and a somewhat right side R of the emission surface 31 (that is, a somewhat right side in a front view). In addition, the secondary reflection surface 36 is intended to emit the emission light L3 (refer to the solid arrow in FIG. 3) as the secondary light pattern P2 from the emission surface 31.

The secondary reflection surface 36 forms a linear surface in a sectional shape and thus as indicated by the solid arrow in FIG. 3, the reflection light L6 is substantially parallel light. The emission surface 31 forms an arc surface in a sectional shape and thus as indicated by the solid arrow in FIG. 3, the emission light L3 is scattered light. The secondary light distribution pattern P2, as shown in FIG. 4, is emitted to the right side with respect to the vertical line VU-VD from the top to bottom of the screen.

The secondary reflection surface 36, as shown in FIG. 3 and FIG. 5, is provided to be continuous in plurality in the light guide direction, corresponding to the main reflection surface 34, at a part of the vertical portion 3V of the light guide member 3. A width of the secondary reflection surface 36 is substantially equal or is slightly narrower (smaller) than a width of the main reflection surface 34.

Between the secondary reflection surface 36 and the secondary reflection surface 36, a planar (or curved) stepped surface is interposed. That is, the secondary reflection surface 36 is provided to be continuous in plurality via the stepped surface. One of the secondary reflection surfaces 36 and one stepped surface form one prism, that is, one of the secondary reflection portion 37.

(Description of Linking Reflection Surface 38 and Linking Portion 39)

The linking reflection surface 38 and the linking portion 39 are respectively disposed (provided) between the main reflection surface 34 and the main reflection portion 35 and between the secondary reflection surface 36 and the secondary reflection portion 37. The linking reflection surface 38 is intended to reflect, to the emission surface 31 side, a part of the incident light L1 that has been made incident through the incidence surface 30 into the light guide member 3, as reflection light L7 (refer to the dashed arrow in FIG. 3), and from the emission surface 31, emit the emission light L4 (refer to the dashed arrow in FIG. 3), that is, as a linking light distribution pattern P3, between the main light distribution pattern P1 and the secondary light distribution pattern P2.

The linking reflection surface 38 forms an arc surface in a sectional shape and thus as indicated by the dashed arrow in FIG. 3, the reflection light L7 is scattered light. The emission surface 31 forms an arc surface in a sectional shape and thus as indicated by the dashed arrow in FIG. 3, the emission light L4 is substantially parallel light. The linking light distribution pattern P3, as shown in FIG. 4, is emitted to a slightly right side with respect to the vertical line VU-VD from the top to bottom of the screen between the main light distribution pattern P1 and the secondary light distribution pattern P2.

The linking reflection surface 38, as shown in FIG. 3 and FIG. 5, is provided to be continuous in plurality in the light guide direction, corresponding to the main reflection surface 34 and the secondary reflection surface 36, at a part of the vertical portion 3V of the light guide member 3. A width of the linking reflection surface 38 becomes a width between the main reflection surface 34 and the secondary reflection surface 36.

Between the linking reflection surface 38 and the linking reflection surface 38, a planar (or curved) stepped surface is interposed. That is, the linking reflection surface 38 is provided to be continuously in plurality via the stepped surface. One of the linking reflection surfaces 38 and one stepped surface form one prism, that is, one of the linking portions 39.

(Description of Low Beam Headlamp 4 and High Beam Headlamp 5)

The low beam headlamp 4 is intended to emit a low beam light distribution pattern from the lamp lens 6 in the forward direction of the vehicle. The high beam headlamp 5 is intended to emit a high beam light distribution pattern from the lamp lens 6 in the forward direction of the vehicle.

(Description of Lamp Lens 6)

A design surface of the lamp lens 6 inclines from the rear side B to the front side F of the vehicle, from the upper side U to the lower side D of the vehicle and from the outside O to the inside I of the vehicle, along the design surface at the front part of the vehicle.

(Description of Inner Panel 7)

The inner panel 7 is mounted directly to the lamp housing or via another member (not shown). The inner panel 7 is intended to cover a part of the semiconductor-type light source 2 and the light guide member 3, that is, one end part at the incidence surface 30 side when the panel is seen from the lamp lens 6.

In the inner panel 7, there is provided a through hole 70 through which one end part at the incidence surface 30 side of the light guide member 3 is to be inserted. Of the inner panel 7, at a portion at which the light guide member 3 is positioned, a housing groove portion 71 is provided. In the housing groove portion 71, the light guide member 3 is housed. An erected wall of the housing groove portion 71 is employed as a reflection surface. It is to be noted that the reflection surface is formed of a material which is the same as that for the inner panel 7. Here, metal plating or metal vapor deposition such as aluminum or silver is applied to the erected wall of the housing groove portion 71, and the reflection surface may be constructed in such a manner as to be able to obtain high reflection efficiency thereof.

(Description of Functions of First Embodiment)

The light guide member 3 and the vehicular lighting equipment 1 according to the first embodiment are made of the constituent elements as described above, and hereinafter, functions thereof will be described.

The light emission portion 20 of the semiconductor-type light source 2 is lit. Then, the light that has been radiated from the light emission portion 20 is incident through the incidence surface 30 of the light guide member 3 into the light guide member 3. The incident light L1 that has been made incident into the light guide member 3 is guided from the incidence surface 30 as one end, to the other end surface 33 side inside of the light guide member 3 while total reflection is repeated.

Apart of the incident light L1 that is guided from one end to the other end inside of the light guide member 3, as reflection light L5, is reflected by the main reflection surface 34 to the front face side of the emission surface 31. The reflection light L5, as emission light L2, passes through the lamp lens 6 from the front face of the emission surface 31 and then is emitted to the outside, that is, in the forward direction (the front side) of the vehicle. In this manner, the front face of the emission surface 31 in the linear shape of the light guide member 3 (the linear shape formed in the L shape in a front view of FIG. 1 and the linear shape formed in the L-shape in side view (the right side view) of FIG. 2) is light-emitted. This emission light L2, as the main light distribution pattern P1, is emitted in the forward direction of the vehicle.

In addition, a part of the incident light L1 that is guided from one end to the other end inside of the light guide member 3, as reflection light L6, is reflected by the secondary reflection surface 36 to a somewhat right side P on the front face of the emission surface 31. The reflection light L6, as the emission light L3, passes through the lamp lens 6 from the somewhat right side R on the front face of the emission surface 31 and then is emitted to the outside, that is, to the somewhat right side R in the forward direction (from the front side F) of the vehicle. In this manner, the somewhat right side R on the front face of the emission surface 31 formed in a linear shape of a part of the vertical portion 3V of the light guide member 3 is light-emitted. The emission light L3, as the secondary light distribution pattern P2, is emitted in the forward direction of the vehicle.

Apart of the incident light L1 that is guided from one end to the other end inside of the light guide member 3, as reflection light L7, is reflected by the linking reflection surface 38 from the front face to the somewhat right side R of the emission surface 31. The reflection light L7 as emission light L4 passes through the lamp lens 6 from the front face to the somewhat right side R of the emission surface 31 and then is emitted to the outside, i.e., to the somewhat right side R in the forward direction (from the front side F) of the vehicle. In this manner, the light is emitted to the somewhat right side R from the front face of the emission surface 31 that is formed in a linear shape of a part of the vertical portion 3V of the light guide member 3.

The emission light L4, as the linking light distribution pattern P3, is emitted between the main light distribution pattern P1 and the secondary light distribution pattern P2 in the forward direction of the vehicle.

The main light distribution pattern P1, the secondary light distribution pattern P2, and the linking light distribution pattern P3, in this example, form a clearance lamp light distribution pattern. The clearance lamp light distribution pattern illuminates the range of about 80 degrees at the outside O of the vehicle, about 40 degrees at the inside I of the vehicle, and about 15 degrees on the top to bottom of the vehicle.

(Description of Advantageous Effects of First Embodiment)

The light guide member 3 and the vehicular lighting equipment 1 according to the first embodiment are made of the constituent elements and functions as described above, and hereinafter, advantageous effects thereof will be described.

The light guide member 3 according to the first embodiment and the light guide member 3 of the vehicular lighting equipment 1 according to the first embodiment are characterized in that the linking portion 39 is installed between the main reflection portion 35 and the secondary reflection portion 37. Thus, between the main reflection portion 35 and the secondary reflection portion 37, a gap is not produced due to the linking portion 39. That is, as shown in FIG. 3 and FIG. 5, the main reflection portion 35 and the main reflection surface 34; the linking portion 39 and the linking reflection surface 38; and the secondary reflection portion 37 and the secondary reflection surface 36 are integrally linked with each other smoothly without any step. As a result, there is an advantageous effect that mold machining is easy and the flow of a resin material at the time of casting is good, etc.

In particular, in the light guide member 3 of which diameter is as long as several millimeters, mold machining can be facilitated by decreasing unevenness and simplifying the shape. In addition, at the time of casting, a rate of an occurrence of a failure can be reduced by improving the flow of the resin material. In this manner, manufacturing costs can be reduced.

The light guide member 3 according to the first embodiment and the light guide member 3 of the vehicular lighting equipment 1 according to the first embodiment are characterized in that the linking portion 39 has the linking reflection surface 38 to reflect the incident light L1 to the emission surface 31 side. Thus, the reflection light L7 from the linking reflection surface 38 and the emission light L4 from the emission surface 31 are efficiently utilized, and the light from the semiconductor-type light source 2, that is, the incident light L1 can be thereby efficiently utilized.

The light guide member 3 according to the first embodiment and the light guide member 3 of the vehicular lighting equipment 1 according to the first embodiment are characterized in that the linking reflection surface 38 reflects the incident light L1 to the emission surface 31 side, and from the emission surface 31, emits the reflected light as the linking light distribution pattern P3 between the main light distribution pattern P1 that is reflected by the main reflection surface 34 and emitted from the emission surface 31 and the secondary light distribution pattern P2 that is reflected by the secondary reflection surface 36 and emitted from the emission surface 31. Thus, it is possible to eliminate a dark part that is produced between the main light distribution pattern P1 and the secondary light distribution pattern P2 due to the linking light distribution pattern P3; and therefore, the light distribution patterns can be integrated with each other. As a result, the visibility at the time of lighting is improved, and the appearance at the time of lighting is also improved.

The light guide member 3 according to the first embodiment and the light guide member 3 of the vehicular lighting equipment 1 according to the first embodiment each have at least vertical portion 3V the secondary reflection portion 37 and the secondary reflection surface 36 and the linking portion 39 and the linking reflection surface 38 are installed at least at the vertical portion 3V; and the secondary light distribution pattern P2 and the linking light distribution pattern P3 are emitted to the outside O of the vehicle. Thus, the visibility at the outside O of the vehicle is improved.

The light guide member 3 according to the first embodiment and the light guide member 3 of the vehicular lighting equipment 1 according to the first embodiment each are characterized in that the erected wall of the housing groove portion 71 of the inner panel 7 is employed as a reflection surface. Thus, the light (such as leak light, for example) from the light guide member 3 that is housed in the housing groove portion 71 is reflected by the reflection surface and then the light from the semiconductor-type light source 2 can be efficiently utilized.

Moreover, the secondary reflection surface 36 is set so that the reflection light L6 from the secondary reflection surface 36 and the emission light L3 are emitted to the reflection surface as the erected wall of the housing groove portion 71, and the reflection surface as the erected wall of the housing groove portion 71 is set so that the reflection light L6 from the secondary reflection surface 36 and the emission light L3 are controlled to be optically distributed as predetermined light distribution patterns. In this manner, the reflection light L6 and the emission light L3 from the secondary reflection surface 36 of the light guide member 3 can be controlled to be optically distributed as predetermined light distribution patterns. As a result, even if the light guide member 3 is housed to be hidden in the housing groove portion 71, the predetermined light distribution patterns can be obtained.

The light guide member 3 according to the first embodiment and the light guide member 3 of the vehicular lighting equipment 1 according to the first embodiment are characterized in that the emission light L2 is emitted from the front face of the emission surface 31 and the emission light L3 is emitted from the somewhat right side R on the front face of the emission surface 31. In this manner, the emission range of the light guide member 3 (the range between the solid arrow at the left side of the emission light L2 and the solid arrow at the right side of the emission light L3 in FIG. 3) can be extended.

(Description of Configuration of Second Embodiment)

Figure 6:
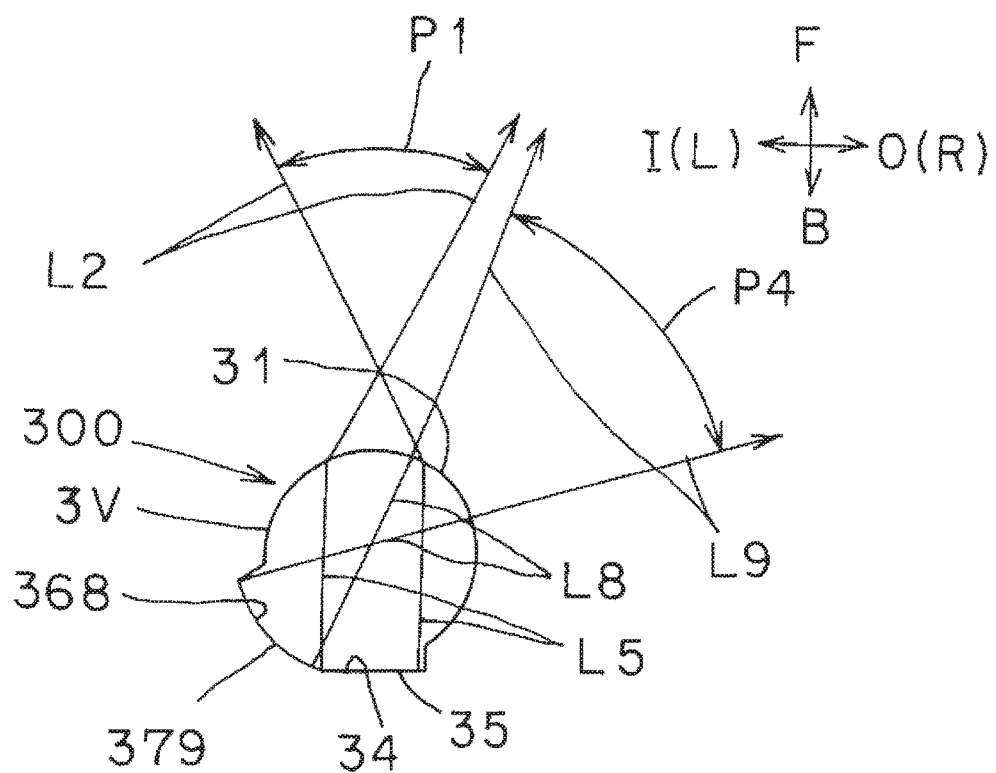
FIG. 6 is an explanatory view of an optical path of light emitted from a light guide member showing a second embodiment of the vehicular light guide member and vehicular lighting equipment according to the present invention.
Figure 7:
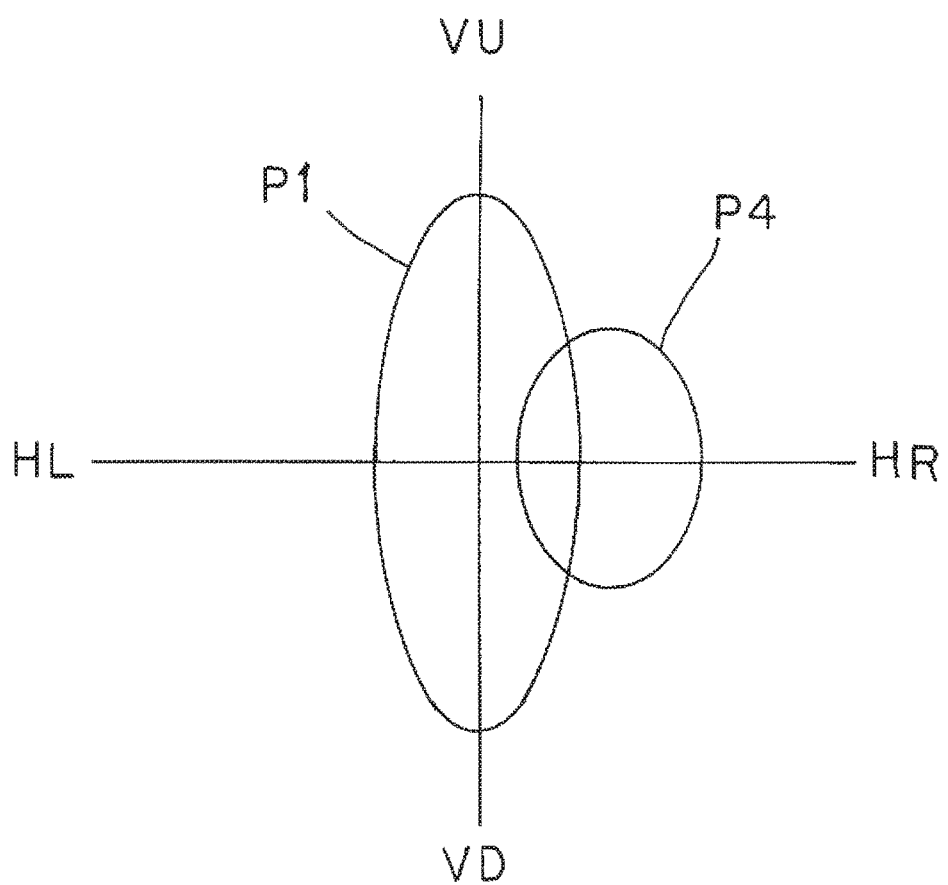
FIG. 7 is an explanatory view showing light distribution patterns emitted from the light guide member.

FIG. 6 and FIG. 7 each show a second embodiment of a vehicular light guide member and vehicular lighting equipment according to the present invention. Hereinafter, a configuration of a light guide member 300 as a vehicular light guide member according to the second embodiment and vehicular lighting equipment will be described. In the figures, the same constituent elements are designated by the same reference numerals in FIG. 1 to FIG. 5.

The light guide member 3 according to the first embodiment and the secondary reflection surface 36 of the secondary reflection portion 37 of the light guide member 3 of the vehicular lighting equipment 1 according to the first embodiment form a linear surface in a sectional shape, and the linking reflection surface 38 of the linking portion 39 forms an arc surface in a sectional shape. On the other hand, a light guide member 300 according to the second embodiment and a secondary reflection surface and a linking reflection surface 368 of a secondary reflection portion and a linking portion 379 of the light guide member 300 of vehicular lighting equipment according to the second embodiment form an arc surface in a sectional shape.

(Description of Function of Second Embodiment)

Hereinafter, a description of function (an optical path) will be furnished with reference to FIG. 6. A part of incident light which is guided inside of the light guide member 300 is reflected to the emission surface 31 side by the main reflection surface 34. The reflection light L5 as the emission light L2 is emitted from the emission surface 31. The emission light L2 as the main light distribution pattern P1 is emitted in the forward direction of the vehicle.

In addition, a part of the incident light that is guided inside of the light guide member 300 is reflected to the emission surface 31 side by the secondary reflection surface and the linking reflection surface 368. The reflection light L8 as the emission light L9 is emitted from the emission surface 31. The emission light L9 as the secondary light distribution pattern P4 is emitted in the forward direction of the vehicle so that a part thereof overlaps at the right side of the main light distribution pattern P1. The main light distribution pattern P1 and the secondary light distribution pattern P4, in this example, forms a clearance lamp light distribution pattern, as is the case with the example mentioned previously.

(Description of Advantageous Effects of Second Embodiment)

The light guide member 300 according to the second embodiment and the light guide member 300 of the vehicular lighting equipment according to the second embodiment are made of the constituent elements and functions as described above; and therefore, there can be achieved advantageous effects which are similar to those of the light guide member 3 according to the first embodiment and the light guide member 3 of the vehicular lighting equipment 1 according to the first embodiment.

(Description of Examples other than First and Second Embodiments)

Incidentally, in the first and second embodiments, a clearance lamp, a turn signal lamp, and a daytime running lamp as front combination lamps were described. However, in the present invention, it is possible to apply these lamps to vehicular lighting equipment such as a turn signal lamp, a clearance lamp, a tail lamp, and a stop lamp as rear combination lamps, for example.

In addition, in the first and second embodiment, the light guide members 3, 300 each form a columnar shape of which sectional shape is a circular shape. However, in the present invention, the light guide member may be formed in a columnar shape of which sectional shape is a triangular shape, rectangular in shape, or polygonal in shape or the like.

Further, in the first and second embodiments, the diameter of each of the light guide members 3, 300 is about 6 mm to 8 mm, the width of the main reflection surface 34 is about 2 mm, and the width of the secondary reflection surface 36 is substantially equal to or slightly smaller than the width of the main reflection surface 34. However, in the present invention, dimensions of the diameter of the light guide member and dimensions of the width of the main reflection surface are not limited in particular.

Furthermore, in the first and second embodiments, the light guide members 3, 300 each form an L-shape in a front view and in a side view. However, in the present invention, the shape of the light guide member is not limited in particular. That is, in the first and second embodiment, the light guide members 3, 300 each have a vertical portion 3V. However, in the present invention, it may be that the light guide members 3, 300 each do not have the vertical portion 3V.

Still furthermore, in the first and second embodiments, at the vertical portion 3V of each of the light guide members 3, 300, there are provided: the secondary reflection portion 37 having the secondary reflection surface 36 and the linking portion 39 having the linking reflection surface 38; and the secondary reflection portion and the linking portion 379 respectively having the secondary reflection surface and the linking reflection surface 368. However, in the present invention, at the horizontal portion 3H of each of the light guide members 3, 300, there may be provided: the secondary reflection portion 37 having the secondary reflection surface 36 and the linking portion 39 having the linking reflection surface 38; and the secondary reflection portion and the linking portion 379 each having the secondary reflection surface and the linking reflection surface 368.

Yet furthermore, in the first and second embodiments, the vertical portion 3V of each of the light guide members 3, 300 is disposed along the edge at the outside O (the right side R) of the vehicle; the horizontal portion 3H of each of the light guide members 3, 300 is, in a side view (in a right side view), disposed along the edge at the lower side D; and the light guide members 3, 300 each are disposed so as to incline from the rear side B to the front side F of the vehicle, from the upper side U to the lower side D of the vehicle. However, in the present invention, the layout of the light guide member is not limited in particular.

Furthermore, in the first and second embodiments, the inner lens is not provided in the lamp room. However, in the present invention, it may be that the inner lens is disposed between a lamp lens 6 and the light guide members 3 and 300.

Still furthermore, in the first and second embodiments, the lamp lens 6 is composed of the transparent lens. However, in the present invention, a scattering prism, for example, a fish-eye prism or the like may be provided in the lamp lens.

Yet furthermore, in the first and second embodiments, the semiconductor-type light source 2 is disposed on the incidence surface 30 side on one end surface of each of the light guide members 3, 300. However, in the present invention, the semiconductor-type light source 2 may be disposed at the other end surface 33 side of each of the light guide members 3, 300.

The invention claimed is:

1. A vehicular light guide member which forms a rod shape to guide light by utilizing total reflection inside thereof, comprising:
   an incidence surface to make light incident to the incidence surface;
   an emission surface to emit the incident light;
   a main reflection portion having a main reflection surface to reflect the incident light to the emission surface side;
   a secondary reflection portion having a secondary reflection surface to reflect the incident light to the emission surface side; and
   a linking portion which is disposed between the main reflection portion and the secondary reflection portion,
   wherein the main reflection portion is provided continuously in plurality in a light guide direction, the secondary reflection portion is provided continuously in plurality in the light guide direction correspondingly to the main reflection surface, and the linking portion is provided continuously in plurality in the light guide direction correspondingly to the main reflection portion and the secondary reflection portion such that the linking portion is integrally linked to the main reflection portion and the secondary reflection portion smoothly without a step in a direction crossing the light guide direction.

2. The vehicular light guide member according to claim 1, wherein the linking portion has a linking reflection surface to reflect the incident light to the emission surface side.

3. The vehicular light guide member according to claim 2, wherein the linking reflection surface reflects the incident light to the emission surface side, and from the emission surface, emits the reflected light as a linking light distribution pattern between a main light distribution pattern, which is reflected by the main reflection surface and emitted from the emission surface, and a secondary light distribution pattern, which is reflected by the secondary reflection surface and emitted from the emission surface.

4. Vehicular lighting equipment comprising:
a lamp housing and a lamp lens which partition a lamp room; and
a light source which is disposed in the lamp room and the vehicular light guide member according to claim 1 to make light from the light source incident to the vehicular light guide member through the incidence surface.

5. The vehicular lighting equipment according to claim 4, wherein the vehicular light guide member has at least a vertical portion,
wherein the secondary reflection portion and the linking portion are installed at least at the vertical portion, and
wherein the secondary light distribution pattern and the linking light distribution pattern are emitted to an outside of a vehicle.

6. The vehicular light guide member according to claim 1.
wherein the linking reflection surface forms an arc surface in a sectional shape of the rod shape.

7. The vehicular light guide member according to claim 1,
wherein the main reflection surface is arranged to reflect the incident light to the emission surface so that the incident light emits from the emission surface as scattered light;
the secondary reflection surface is arranged to reflect the incident light to the emission surface so that the incident light emits from the emission surface as scattered light; and
the linking portion includes a linking reflection surface arranged to reflect the incident light to the emission surface so that the incident light emits from the emission surface as parallel light.

* * * * *